United States Patent [19]

Culler

[11] Patent Number: 4,837,682
[45] Date of Patent: Jun. 6, 1989

[54] BUS ARBITRATION SYSTEM AND METHOD

[75] Inventor: Glen J. Culler, Santa Barbara, Calif.

[73] Assignee: Glen Culler & Associates, Goleta, Calif.

[21] Appl. No.: 35,307

[22] Filed: Apr. 7, 1987

[51] Int. Cl.$^4$ ............................................. G06F 1/00
[52] U.S. Cl. .................................................... 364/200
[58] Field of Search ............................. 364/200, 900

[56] References Cited

U.S. PATENT DOCUMENTS

| | | | |
|---|---|---|---|
| 4,101,960 | 7/1978 | Stokes et al. | 364/200 |
| 4,123,794 | 10/1978 | Matsumoto | 364/101 |
| 4,181,936 | 11/1980 | Kober | 364/200 |
| 4,214,305 | 7/1980 | Tokita et al. | 364/200 |
| 4,302,818 | 11/1981 | Neimann | 364/736 |
| 4,457,849 | 10/1985 | Louie et al. | 364/200 |
| 4,646,232 | 2/1987 | Chang et al. | 364/200 |

*Primary Examiner*—Raulfe B. Zache
*Attorney, Agent, or Firm*—Freilich, Hornbaker, Rosen & Fernandez

[57] ABSTRACT

A bus arbitration system for use in a data processing system which operates on clocked cycles for determining priorities in accessing a system memory and one or more local memories associated with processor units is shown. Each of the processor units are operatively coupled through a local bus to its associated local memory. A system bus interconnects the processor units and local memories in parallel to the local bus and the system is connected to an input/output device and the system memory. The bus arbitration system monitors requests made by processor units or the input/output device for access to the system memory or a local memory during the clock cycle. A determination section of a bus arbitration module determines whether access is available over the system data bus or a local data bus. A priority logic section identifies the existence of a conflict due to one or more of the processor units and the input/output device requesting access over the system bus to either the system memory or the same associated local memory during the clock cycle and for granting a request to a selected one of the processor units or the input/output device for accessing either the system memory or one of the associated local memories over the system bus. When a processor unit is denied access to the system bus, and in the absence of a conflict in request for the same associated local memory, a request is granted to a processor unit to access its associated local memory over its local bus during the clock cycle.

8 Claims, 4 Drawing Sheets

BUS ARBITRATION SYSTEM AND METHOD

BACKGROUND OF THE INVENTION

1. Field of the Invention

This invention relates to a means for controlling access by a plurality of processor units and input/output devices to local memories associated with the processor units, and to a system memory over a system bus; and, more particularly, to a bus arbitration system and method for use in a data processing system which operates on clocked cycles to grant a request by processor units and input/output device to access an associated local memory or a system memory over a system bus and, where possible, to permit a processor unit to access its associated local memory over a local bus in parallel to a selected one of processor units and the input/output devices utilizing the system bus for accessing memories.

2. Description of the Prior Art

It is known in the art for a data processing system to have a plurality of processor units, each of which has its own associated local memory, and to have shared access over the data processing system's system bus to a global or system memory. Also, it is known in the art for input/output devices to access, over the system bus, both the system memory and associated local memories.

In the event that one or more processors or the input/output devices require accessing either the system memory or one of the associated local memories, a conflict is present as to which requesting unit is to be given the right to utilize the system bus. When a plurality of processors and input/output devices require use of shared resources for performance, and only a single unit can be granted access to the system bus during a clock cycle, system degradation results in terms of decreased operating speeds due to the inability of more than one unit to utilize the system bus for accessing memories.

The prior art data processing systems tolerate such conflicts in shared resources in that the data processing system has some economics from being able to share input/output devices, power supplies, cabinets, and the like, among various processor units and input/output devices. However, if system performance levels are to be increased, it is necessary to increase the bandwidth of the system bus or to provide for additional parallel accessing paths without seriously affecting the economics of the data processing system in terms of the price/performance ratio.

SUMMARY OF THE INVENTION

The present invention relates to a novel and unique bus arbitration system and method adapted for in a data processing system which operates in clocked cycles wherein the data processing system includes a plurality of processor units, each of which is operatively coupled through a local bus to an associated local memory. A system bus interconnects the processor units and local memories in parallel to the local bus. Also, the system bus is operatively connected to at least one input/output device and at least one system memory and is capable of transferring data over the system bus among the various system components, including the processor units and local memories.

In the bus arbitration system method of the present invention, means are provided which are operatively coupled to each of the processor units and the input-output device for monitoring when access is required by at least one of the processor units and the input/output device to the system memory or to one of the local memories during the clock cycle. The bus arbitration system includes means which are responsive to the monitoring means for determining whether a request for access can be executed over either of the system bus and a local bus during the clock cycle.

A priority logic means identifies the existence of a conflict due to one or more of the processor units and the input/output device requesting access over the system bus to at least one of the system memory and the same associated local memory during the clock cycle. The priority logic means grants a request to either one of the processor units or to the input/output device for accessing either the system memory or one of the local memories over the system bus during the clock cycle. If the system bus is denied to a processor unit, and in the absence of a conflict in requests to access the same local memory, the priority logic means grants a requesting processor unit request to access its associated local memory over its local data bus during the system clock cycle thereby increasing system bandwidth and performance.

A control means is operatively coupled to the priority logic means for enabling the processor unit or the input/output device, which was granted priority, to access the required memory over a system bus and concurrently enables a processor unit, which has been granted priority, to access its associated local memory over its associated local bus. Thus, it is possible that a system bus and one or more local buses can be utilized for a memory read or store cycle during the clock cycle. The priority logic means is responsive to all of the conflicts between processor units and the input/output device requests to deny access to other local memories and the system memory for the clock cycle.

In addition, this invention relates to a novel, unique and improved method for arbitrating requests for access to memories in a data processing system. The method for arbitrating access to the memories comprises the steps of monitoring each of the processor units and the input/output device for determining when a request is made by at least one of the processor units and the input/output device for access to the system memory or a local memory during the clock cycle; determining whether or not the request for access can be executed over both the system bus and the local bus during the clock cycle; identifying the existence of a conflict due to one or more requests from the processor units and the input/output device for accessing over the system bus to one of the system memory or the same local memory during the clock cycle and for granting access to only one of the processor units or the input/output device for accessing over the system bus the system memory or one of the local memories during the clock cycle; in the absence of a conflict in a request for accessing the same local memory, granting access to a processor unit to access its associated local memory over its local data bus during the clock cycle; and enabling the selected processor unit or the input/output device being granted priority to access over the system bus either the system memory or one of the local memories and enabling a processor unit granted priority to access its associated local memory over its associated local bus but wherein all other conflicts in requests for access to the system memory and local memories by the processor units and the input/output device are denied for the clock cycle.

One of the disadvantages of the prior art data processing systems having shared access among various computer memories, processor units, and local and system memories is that an increase in the number of units requesting use of the system bus to access local memories and increasing the number of operations in a data processing system requiring use of a system bus results in system degradation due primarily to conflicts between requesting units utilizing the system data bus and the fact that the system bus can handle only a single access during one clocked cycle.

One advantage of the present invention is that the data processing system includes a local bus which is operatively connected between a processor unit and its associated local memory, enabling a bus arbitration system to grant requests from a requesting unit to utilize a system bus on a priority basis and, provided the same local memory is not being requesting by the requesting unit, permits parallel operations over local buses between a processor unit and its associated local memory.

Another advantage of the present invention is that the effective memory bandwidth is increased by permitting access to local memories and system memory over both the system bus and local bus in the absence of a conflict in accessing the same memory.

A further advantage of the present invention is that during the first half of a clock cycle the bus arbitration process occurs between the units which request the system bus for the cycle and data which has been read in a previously granted access cycle is returned to the unit which performed the read during the previous cycle. In the second half of the clock cycle, the unit which requested and was granted access to a system bus or a local bus transfers the address of the memory location to be read over the system bus or the memory address in which information is to be stored. Also during the first half of the clock cycle, data to be stored in the memory at the memory location is transferred over the system bus for storage in the memory at the address location.

Another advantage of the present invention is that the bus arbitration system, absent any conflict between units, will utilize the system bus to carry out all memory accesses until a conflict exists. Thereafter, the bus arbitration system will determine whether or not the local bus between one of the processor units and its associated memory can be utilized to effectively permit more than one operation to occur in the clock cycle.

A yet further advantage of the present invention is that when the bus arbitration system makes a determination that a conflict exists between the use of the system bus by one or more units, the processor unit request is granted, enabling such processor unit to access its local memory over the local bus, which access occurs in parallel to the system bus being used by another unit accessing a memory other than the one accessed by the processor unit.

A still further advantage of the present invention is that if a process user or input/output device is making heavy use of a processor unit's local memory, the associated processor unit will have access to the system bus through the bus arbitration system such that such processor unit will share access with other processor users and the input/output device over the system bus to its associated local memory.

BRIEF DESCRIPTION OF THE DRAWING

These and other advantages of the present invention, taken with its various features, can be more easily understood based upon a more detailed description of the preferred embodiment taken in conjunction with the following drawings covering the following figures.

DESCRIPTION OF THE PREFERRED EMBODIMENT

Figure 1:
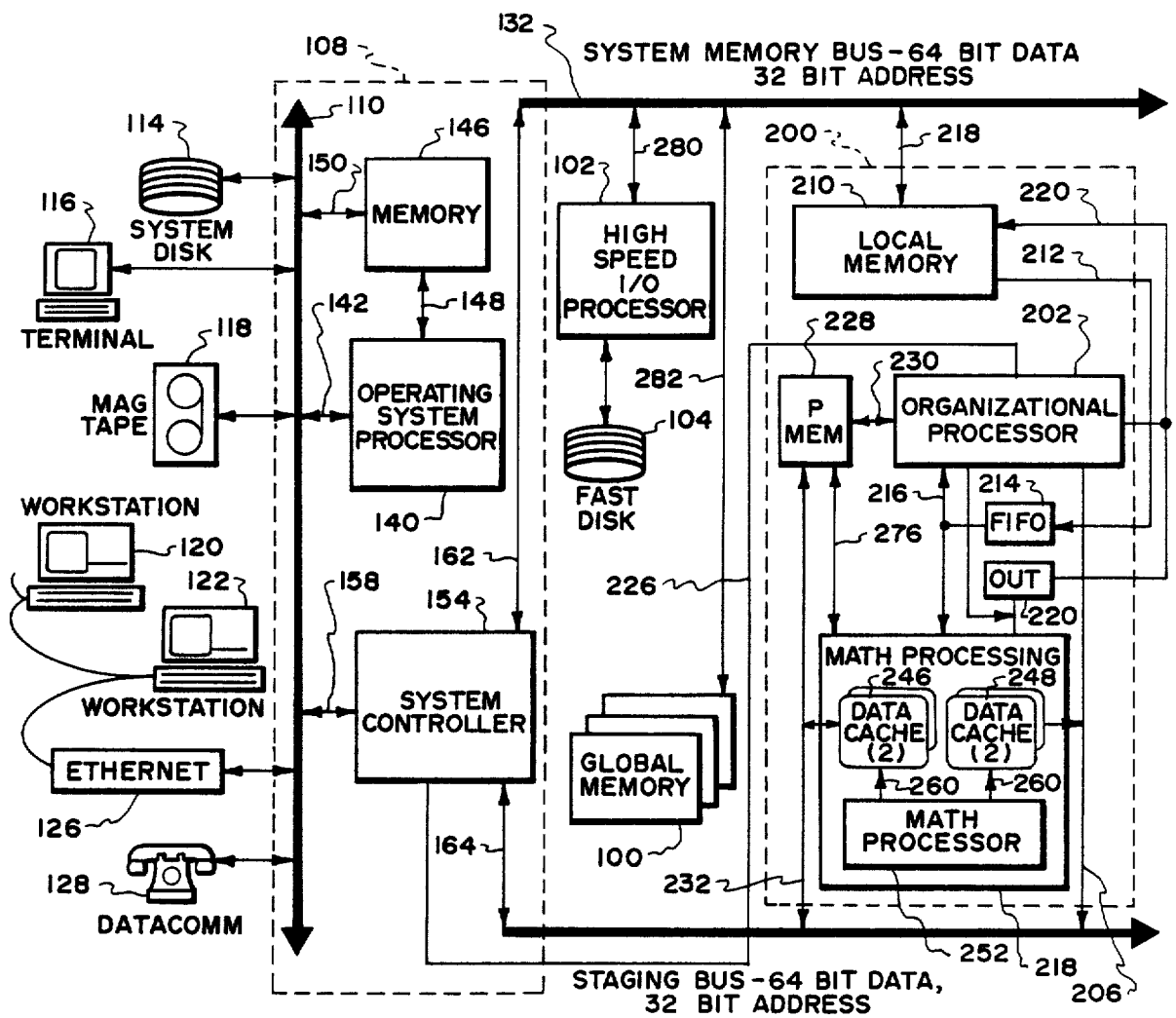
FIG. 1 is a diagram representing an integrated, multicomputer data processing system having "N" application processor sections.

FIG. 1 illustrates an integrated, multicomputer data processing system which includes identical application processors. The data processing system includes a first application processor section 200, a second application processor section 300, and an "N" application processor 302. In the preferred embodiment, the integrated, multicomputer data processing system is capable of operating with up to four application processors based upon the design set forth herein. However, it is envisioned that the operating system processor 140, system controller 154, system data bus 132, and staging bus 136 could be designed and programmed with appropriate compilers and the like in order to handle more than four application processors, thereby increasing the MIPS and MFLOP rates of processing data. The operating system processor 140 controls operation of each of the application processors 200, 300 and 400 through the system controller 154.

Application processors 200, 300 and 400 each have an associated local memory 210, 310 and 410, respectively. Each of the local memories 210, 310 and 410 is operatively coupled to the system data bus 132 by connecting means 218, 318 and 418, respectively. The system data bus 132 includes a local bus as a part thereof, which permits the basic processors 202, 302 and 402 of application processors 200, 300 and 400, respectively, to access the system data bus via connecting means 204, 304 and 404, respectively.

Figure 2:
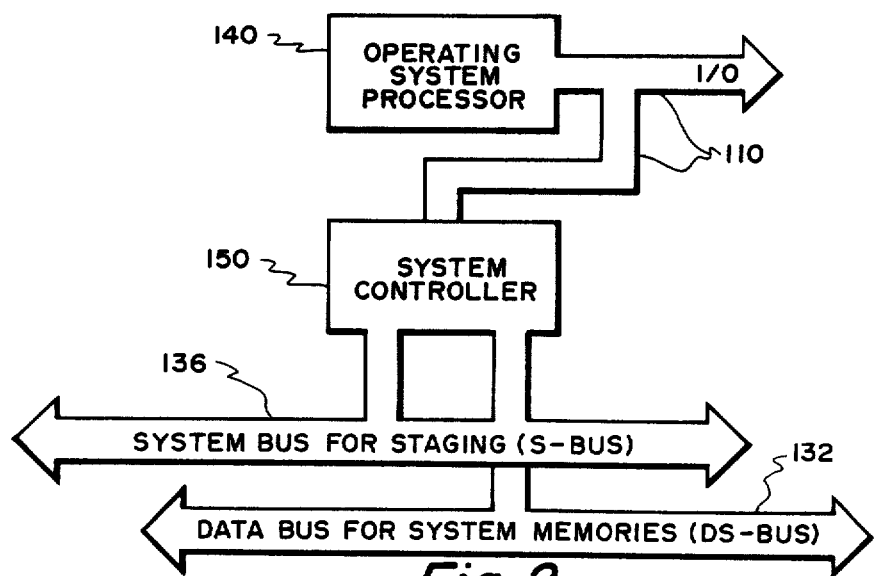
FIG. 2 is a logic diagram illustrating the relationship between the operating system processor, which is operatively coupled to a multibus I/O and a staging controller.

FIG. 2 is a logic block diagram which illustrates the process utilized by the integrated, multicomputer data processing system for preloading the application processor with data signals and addressing signals to ensure that the application processor is continuously loaded with assigned tasks in the form of programmed arithmetic operations and for transferring executed arithmetic operation results from the application processor to the multibus and I/O devices.

As illustrated in FIG. 2, the operating system processor 140 is operatively connected to the multibus 110 to transfer information between the input-output devices 114 through 120 and the operating system processor 140. The operating system processor 140 is operatively connected to the system controller 154 and applies program signals, interrupt signals, and execution signals thereto. A high speed I/O processor 102 and fast disc 104 and global memory 100 can transfer data with the system bus 132. When the operating system processor 140 desires to initiate a task in the form of a programmed arithmetic operation in an application processor, the operating system processor 140 completes a task control block specifying the task or arithmetic operation to be performed, the size of the task in bytes, and the starting address in memory, together with additional control information. When the task information has been assembled by the operating system processor 140, the operating system processor 140 generates an interrupt signal which is applied to the system controller 154 by the multibus 110. The system controller 154 receives the task control block of information from the operating system processor 140 and loads the information contained within the task control block such that the data and address required for the system memories is loaded over the system data bus 132 to the application processor and the staging information in terms of the programmed arithmetic operation, the data signals and addressing signals therefor are loaded into the application processor over the staging bus 136.

The operating system processor 140, together will the system controller 154, is capable of controlling up to four application processors, as described above. The system data bus 132 and the system staging bus 136 are capable of loading up to eight banks of memory wherein each memory comprises four megabytes and the loading can be accomplished at a transfer rate of 56 megabytes per second. As noted in connection with the description of FIG. 4, each application processor has a local memory which is a private memory, or associated local memory for that specific application processor and the system data bus 136 has system access to all of the memory banks as well as the local memory banks.

Figure 3:
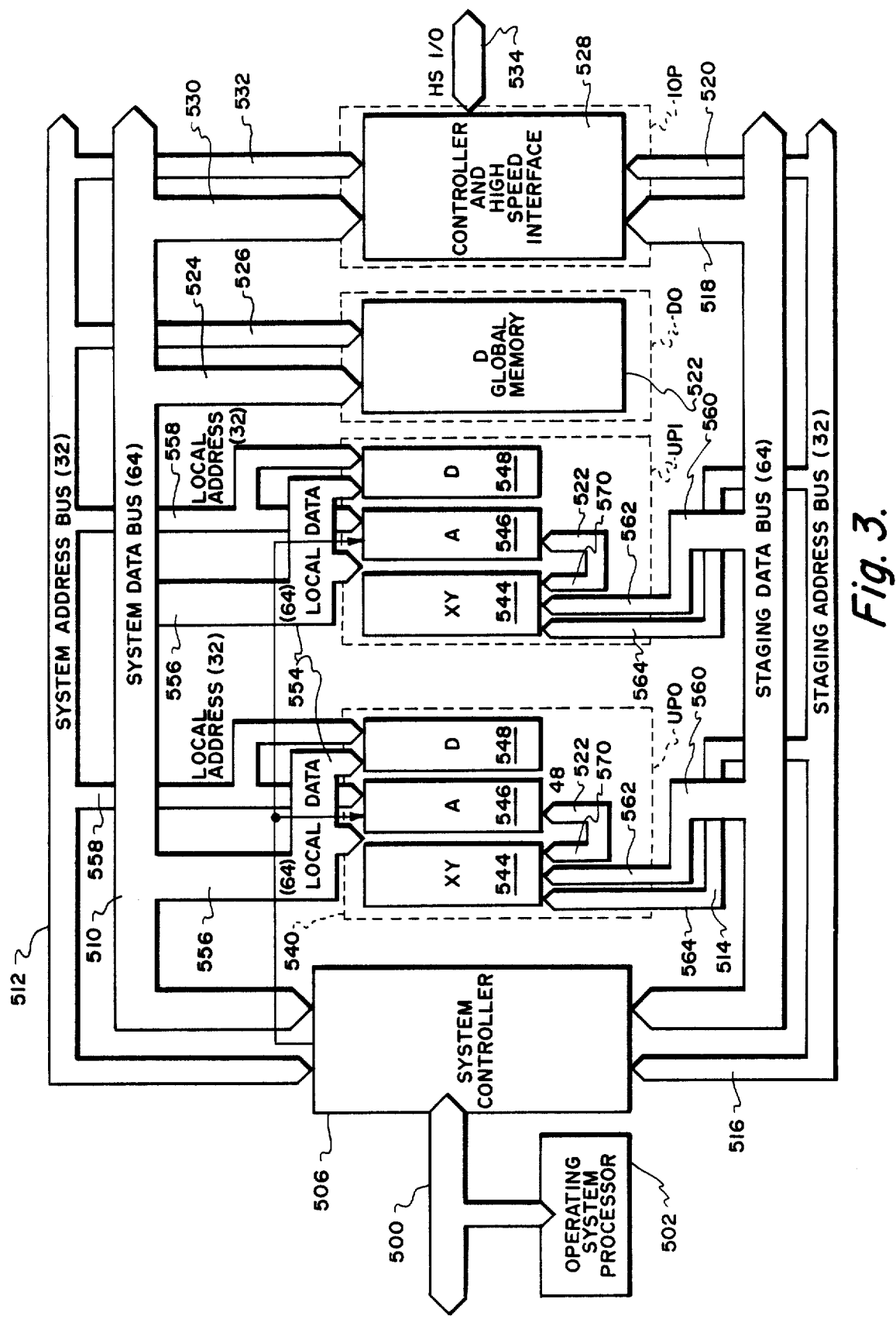
FIG. 3 is a logic diagram showing the functional relationships between the application processor, system data bus and staging address bus for transferring instructions and data in parallel into the application processor.

FIG. 3 is a logical block diagram representing the architecture of two application processors 200 and 300 illustrated in FIG. 1.

In FIG. 3, the logic diagram illustrates in integrated, multicomputer data processing system having two identical application processor sections identified as 540.

Transfer of information into the integrated, multicomputer data processing system from the outside world is accomplished through peripheral devices which are applied to a multibus 500 which, in turn, transfers the information between the input-output devices and the operating system processor 502. The operating system processor 502 communicates over the multibus 500 with the staging controller shown by rectangle 506. The staging controller is operatively connected to a system data bus 510 and a system address bus 512. The system data bus 510 is capable of communicating 64 bits of data and 32 bits of address within the data processing system. The system controller 506 is operatively connected to the staging data bus 514 and to a staging address bus 516. The staging data bus 516 transfers data having 64 bits and addresses having 32 bits within the data processing system to specific application processors.

The system data bus 510 and the system address bus 512 are operatively connected to a global or system memory 520 by means of a system data bus segment 524 and a system address bus segment 526. In a similar manner, a controller and high-speed interface 528 communicate through the high-speed input-output device over a bus 534. The controller and high-speed interface 528 likewise is operatively connected to the system data bus 510 via a system data bus segment 530 and to the system address bus 512 by system address bus segment 532. The controller and high-speed interface 528 is connected to the staging data bus 514 by means of staging data bus segment 518 and to the staging address bus 516 by staging address bus segment 520. The controller and high-speed interface 528 is adapted to apply data to and receive data from each of a system data bus 510, system address bus 512, staging data bus 514, and staging address bus 516.

The logic diagram of FIG. 3, having two identical application processors 540 illustrates that each application processor 540 includes a simple math processor and a complex math processor, generally referred to as the "XY machine" 544. In addition, each application processor 540 includes a basic processor 546, generally referred to as the A machine, and a local memory 548. Also, each application processor includes an instruction cache 550. The system data bus 510 is operatively connected to the XY machine 544, to the A machine 546 and to the local memory 548 by means of a local data bus segment 556. System address bus 512 is operatively connected to the basic processor 546 and to the local memory 548 by means of a local address bus segment 558.

The instruction cache 550 is operatively connected to the stating bus 514 via staging bus segment 560 and to the staging address bus 516 via a staging address bus segment 556. The staging data bus 514 is operatively connected to the XY machine 544 by means of staging data bus segment 562. In a similar manner, the XY machine 544 is operatively connected to the staging bus 516 via staging bus staging bus segment 564. The instruction cache 550 is operatively connected to the XY machine via a bus 570 and to the basic processor, or the A machine, by bus segments 522.

The logic block diagram of FIG. 3 clearly illustrates the flexibility and capability of the operating system processor 502 to control the staging controller 506 enabling the staging controller 506 to load and/or remove data from each of the application processors while the application processor is executing an arithmetic operation. The system controller 506 under control of the operating system processor 502 transfers data into and out of the application processors 540 by means of the system data bus 510 and the staging data bus 514. The transfer of data can be in parallel, as evidenced by each bus segment. Likewise, addresses which are utilized to fetch instructions within the application processor can be applied by the system address bus 512 and the staging address bus 516 to ensure that the required instructions are always available to the application processor for efficient operation.

Figure 4:
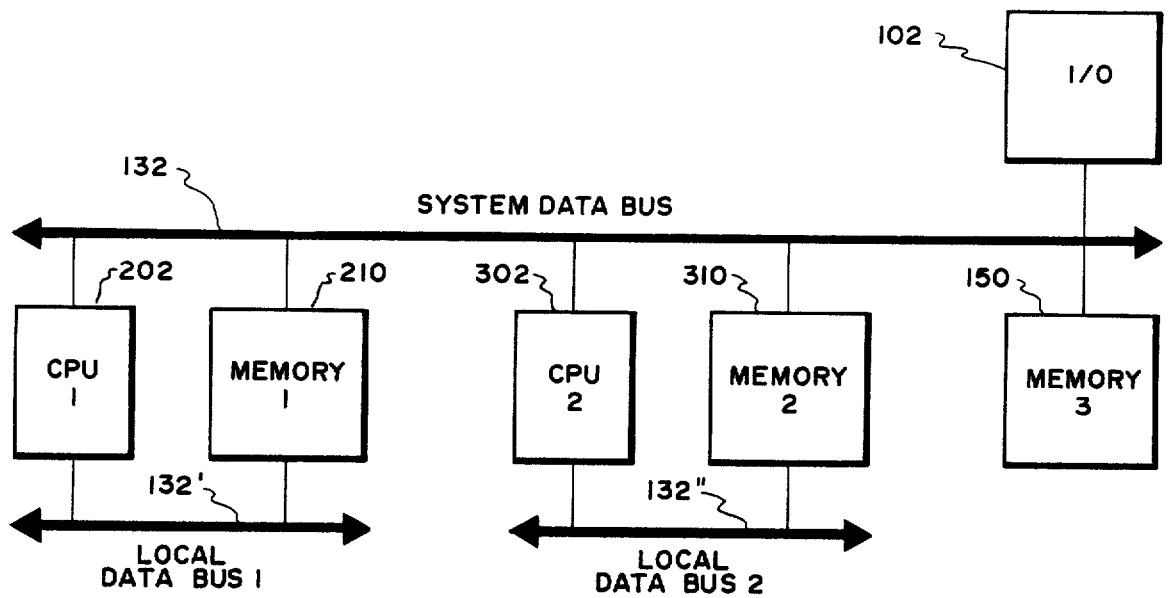
FIG. 4 is a block diagram showing two processor units, each having its associated local memory and a local bus, a system memory and an input/output device operatively coupled to a system bus.

FIG. 4 illustarates one embodiment of a memory organization which represents the data processing system illustrated in FIG. 1. The embodiment of FIG. 4 illustrates that each processor user 202 and 302 is operatively connected with its associated local memory 210 and 301, respectively, via local data bus 132' and 132", respectively. In addition, the global or system memory 150 and the input/output device 102 are operatively coupled to the system data bus 132.

As illustrated in FIG. 4, the three memory banks 210, 310 and 150 can be addressed over the system data bus. In the alternative, processor user 202 can access its associated local memory 210 over its associated local data bus 132', and processor user 302 can access its associated local memory 310 over local data bus 132'. As illustrated in FIG. 4, it is possible for the input/output device 102 to access the global memory 150 via the system data bus 132. Also, processor user 202 can concurrently access its associated local memory 210 over local data bus 132'. This arrangement increases the bandwidth of the system data bus during the clock cycle when both the global memory 150 and the local memory 210 are being concurrently accessed. In addition, it is also possible for processor user 302 to access its associated local memory 310 over local data bus 132'. This access can occur in parallel to the input/output device 102 accessing the global memory 150 over the system data bus and the user processor 202 accessing memory 210 over its local data bus 132'. Thus, in the configuration illustrated in FIG. 4, the effective bandwidth during a given clock cycle of access to the system data bus and/or local data bus can be increased depending on the processor or device which requires use of the system data bus. Specifically, based on the block diagram of FIG. 4, it is readily apparent that the input/output device 102 could not access the local memory 210 over system data bus 132 at the same time the processor user 202 is accessing the same memory over local data bus 132'. Specifically, if the input/output device 102 must access local memory 210 over the system data bus 132 at the same time processor user 302 is required access local memory 310 over the system data bus, a priority conflict results. It is in this situation where the bus arbitration method and apparatus of the present invention are utilized for performing arbitration of the various priorities among units requesting use of the system bus.

Figure 5:
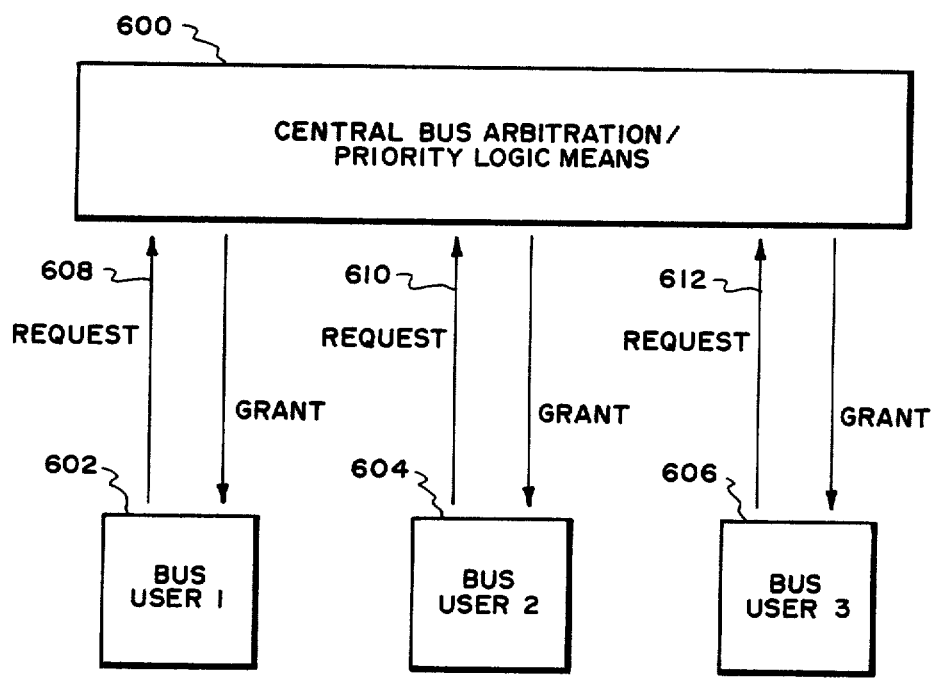
FIG. 5 is a block diagram showing the relationship between the central bus arbitration module with respect to monitoring of and granting or requests to a user to utilize the system bus.

As illustrated in FIG. 5, the system includes a bus arbitration module which is generally referred to as a priority logic module 600. In the arbitration system illustrated in FIG. 5, each potential system bus user, illustrated as bus users 602, 604 and 606, has two signals which exist between the users 602, 604 and 606 and the system bus arbitration/priority logic means 600, those signals being request and grant signals. The two signals for use by user 602 are illustrated by arrow 608, the request and grant signals for user 604 are illustrated by arrow 610, and the request and grant signals for use 606 are illustrated by arrow 612.

The processor units 202, 302 and 310 illustrated in FIG. 4, which are represented as a bus user in FIG. 5, operate on clocked cycles which consist of a memory cycle comprising two half cycles of the clock cycle. In the embodiment of FIG. 5, during the first half of the clock cycle, the monitoring means, determination means, and priority logic means, which are included within block 600 perform the bus arbitration between the various users 602, 604 and 606. The bus arbitration takes place between the users 602, 604 and 606 which need the system data bus for the clock cycle. In addition, any data which has been read by a user in response to a request for access which was granted during the prior clock cycle is returned to the unit which was granted the use of the system bus. In the second half of the clock cycle, whichever of the units 602, 604 or 606 granted access to the system data bus during the first half-cycle functions to apply, over the system data bus, the memory location or memory address of the selected memory to be accessed and, if the access is to provide for storing of data, the memory address means is responsive to a system data bus to load the requisite data into the access memory at the addressed memory location.

In concept, the data processing system first operates on the basis that all memory accesses between units are to occur over the system data bus. This permits any specific unit to access any memory by means of the system data bus during a clock cycle. However, if more than one user requires the use of a system data bus to access a memory, and each of those units requires that the system data bus be utilized for the memory access during the same clock cycle, a conflict occurs and the central bus arbitration/priority logic means 600 of FIG. 5 functions to identify those conflicts and to determine which request is to be granted to which user for utilizing the system data bus to access a memory.

The central bus arbitration/priority logic means 600 of FIG. 5 utilizes the following criteria for resolving the conflict and granting requests to utilize the system data bus and/or local data bus:

(1) Each processing unit 202 and 302 has two exclusive possible states for accessing memory, which are:
  (a) State one, wherein access to a memory is provided over the system bus; or
  (b) State two, wherein access to a memory is provided by a local bus.

In the first state, the central bus arbitration/priority logic means 600 will attempt to grant memory accesses over the system data bus. If a conflict occurs, that is, two or more of users 602, 604 or 606 have requested use of the system bus, such requests cannot be granted. The central bus arbitration/priority logic means 600 will grant one user the use of system bus.

(2) In the event that a conflict occurs between a processor unit over a local bus and the system bus for access to a local memory, the system access from the system bus is given priority and the local access is refused.

(3) A processor unit 202 or 302 will then change from its state 1 of system bus access to state 2 of local bus access if the system memory access is refused and if the data requested is in its associated local memory 210 or 310, respectively, and the system bus access is not to the local user. And that request will be granted over the local bus. In this case, the memory access occurs without any delay and the access method state is maintained in the state 2 level. To reiterate, in order for the state two level to be imposed wherein the processor unit can access its associated local memory, the following conditions must be satisfied:
  (a) A local memory access is being requested by an associated processor unit;
  (b) The system bus request is refused by the arbitrator; and
  (c) The requesting unit which is granted the system bus for making the memory access during the first half of the clock cycle is not making an access to the local memory which is to be accessed by its associated processor unit.

(4) The processor unit will change from its state 2, which is the local bus access, to state 1, which is the system data bus access, if a local data bus access is refused because of a conflict with the system data bus or because the address memory location not in its associated local memory. In such event, the ability to access any memory during the specific clock cycle is lost and the memory access is to be retired over the system data bus in the next clock cycle.

Each of the above-described steps of the method results in the following effects:

In criterion (1) described above, the decision whether or not a user should request the system bus is made as early as possible in the beginning of the memory cycle since the bus arbitration decision is a critical timing path in both the system operation and the in ability of the user to complete a memory access during the specific clock cycle. In the embodiment of the data processing system illustrated in FIG. 3, data is read from local memories by means of a memory addressing means which is responsive to an address register (not shown). The memory address stored in the address register is translated to memory addressing signals which occur at the same time during the first half of the clock cycle as when the bus arbitration is being performed, so that it is known during the first half-cycle whether the address memory location is in a local memory or whether other potential users are to make a request for access to the local memory over a system data bus.

With respect to criterion (2) described above, a local processor unit has the capability of dominating the local data bus, which effectively denies access to all other processor units or input/output device to access the local memory if continued priority is given to the associated processor unit. In typical applications, it is not unusual for the local processor unit to be a heavier user of its associated local memory than the other processor units of the input/output device. In such applications, increased overall data system performance is obtained when preference is given by the bus arbitration module to processor units and input/output devices with a lower duty cycle to use the system bus to access the local memory.

With respect to criterion (3) set forth above, the capability of a processor unit to access its local memory over the local bus results in maximum utilization of the local bus during each clock cycle, which effectively increases the bandwidth of the memory access during the clock cycle because the system data bus is utilized in parallel with the local bus, enabling parallel memory access operations, which increases overall data system performance.

Criterion (4) described above permits the processor unit to change its state from the local bus address to a system bus address when it is necessary to allow a processor unit to access local memories other than its associated local memory and enables the processor unit to compete on an even basis for a local memory when other processor units and input/output devices require a large number of accesses to the local memory.

Figure 6:
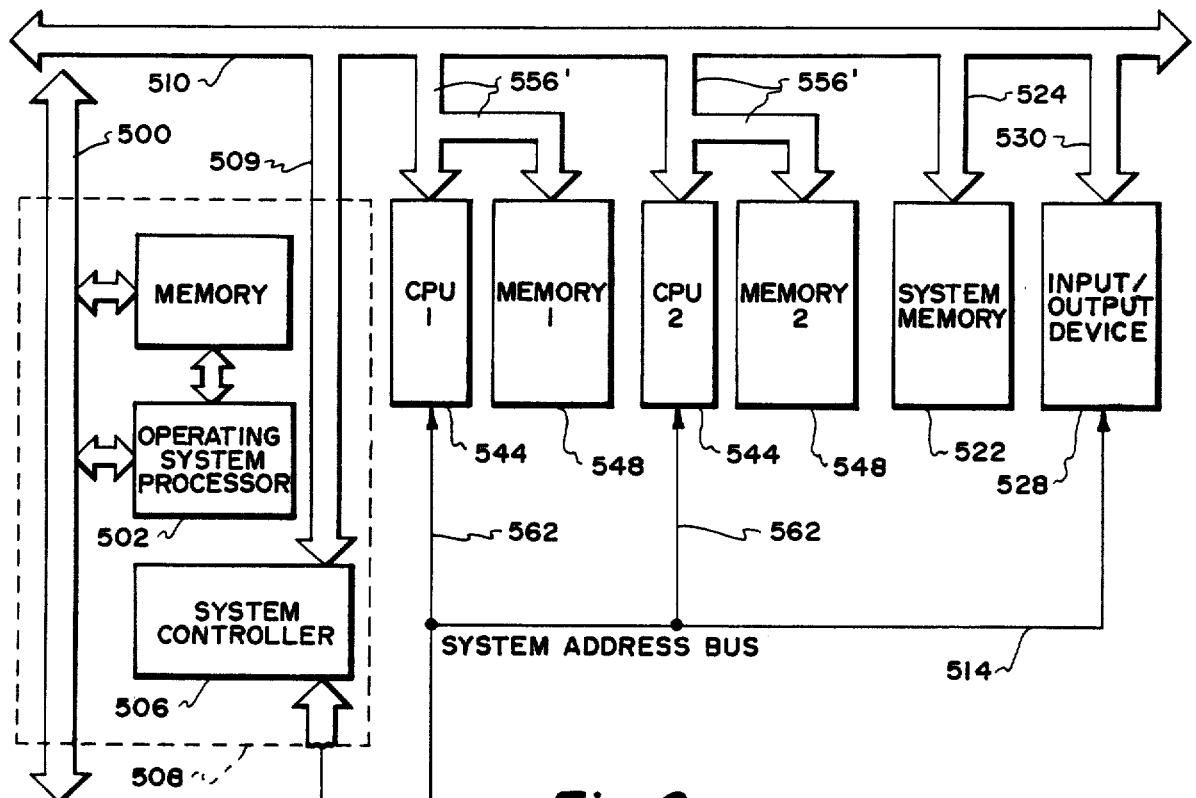
FIG. 6 is a block diagram of a data processing system having two processor units, its associated memory, system memory and an input/output device which is controlled by the priority logic means which functions as the bus arbitration.

FIG. 6 illustrates in a block diagram a generalized representation of the data processing system illustrated in FIG. 3. The system data bus 510 and the system address bus 514 provide means for loading data and addresses from memories into processor units 544 and memories 548. The system data bus 510 is operatively connected to the processor units 544 and 548 via data bus segments 556. The data buses include a local data bus portion thereof which permits the processor unit 544 to transfer data between its associated local memory 548 over the parallel local data bus segment 556'. The bus arbitration system illustrated by dashed box 508 includes a bus arbitration module which is included within the operating system processor 502, which operating system processor 502 communicates with the staging controller 506 via the multibus 500. The staging controller 506 monitors and enables operation of each of the processor units 544 and the input/output device over the system bus via its interconnecting means 509, which is operatively coupled to the system data bus 510. Instruction addresses which are adapted to be translated into memory addresses for accessing the local memories 548 are operatively coupled to the processor units 544 via connecting means 562.

The bus arbitration system monitors the various requests from the processor units 544 and the input/output device 528 for access to the system memory 522 or to one of the local memories 548, and identifies when a conflict exists therebetween. The priority logic means grants and denies the requests for access over the system bus and local bus to the memories, as described hereinbefore.

FIG. 6 illustrates by means of a block diagram a method for arbitrating access to memories in a data processing system. The bus user 600 has state one, which requests access over the system bus, and state two, which requests access over the local bus. The bus arbitration module includes monitoring means for monitoring requests from each of the processor units and an input/output device which is represented by bus user 600. The monitoring step shown as block 602 determines when a request is made by at least one of the processor units and the input/output device for access to at least one of a system memory and the local memories during a clock cycle. The next step is that of determining whether the requested access can be executed over the system bus and local bus during the clock cycle, which determining step is represented by block 606.

The next step of identifying the existence of a conflict due to one or more of the processor units and the input/output device requesting access over the system data bus to at least one of the system memory or to the same local memory during a clock cycle is performed by a priority logic means 610. The priority logic means 601 performs the step of identifying conflicts and granting access to at least one of the processor units and the input/output device for accessing over the system data bus at least one of the system memory and the local memories during a clock cycle. If the priority logic means grants the request for accessing over the system data bus, the priority logic means 610 grants access as illustrated by arrow 612, which permits a control means to enable a selected one of the processor units and input/output device which was granted the access to at least one of the system memory and the local memories over the system bus. The system enable step is illustrated box 616.

In the absence of a conflict for a request to access the same local memory, the priority logic means 610 grants a request to a processor unit to access its associated local memory over the local bus, and the granting of the request is illustrated by arrow 620, which enables a local bus enable, represented by box 622.

The system bus enable 616 applies an execute signal to the bus user 600, as illustrated by arrow 626, which permits the bus user to transfer data over the system data bus. In the event that the system data bus is not available to the bus user, the state two request then occurs and the local bus enable 622 enables the bus user 600 to execute the data transfer between that processor user and its associated local memory over the local bus, as illustrated by arrow 630.

Figure 7:
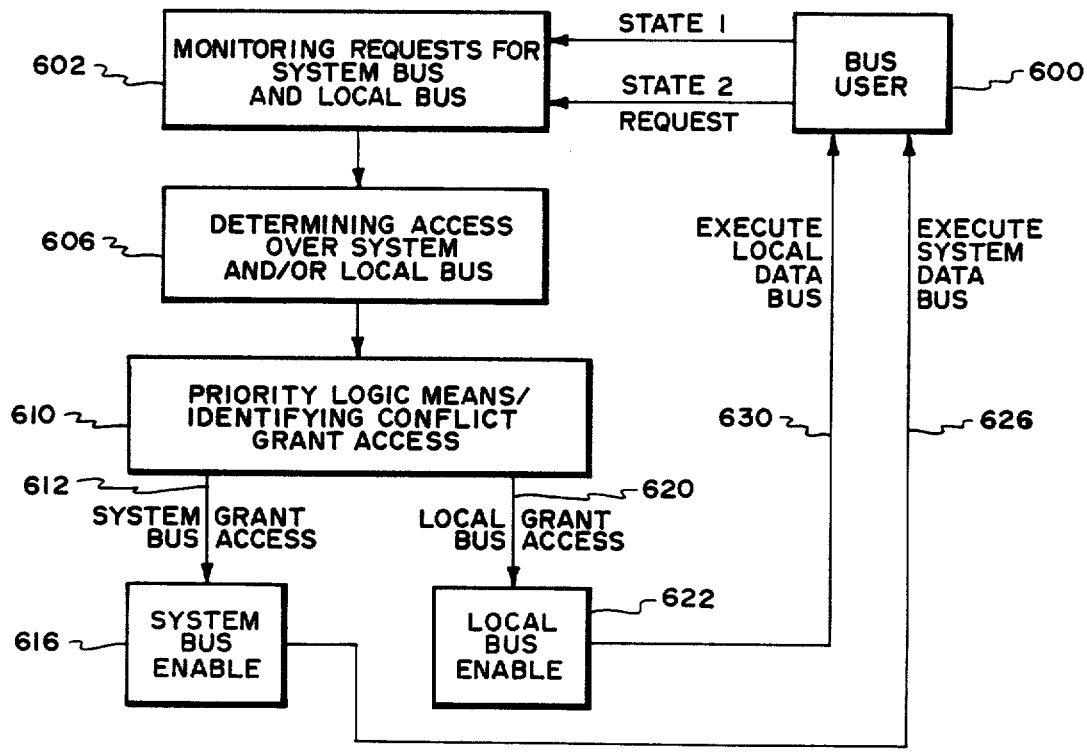
FIG. 7 is a block diagram showing the method utilized for providing the bus arbitration.

The method for arbitrating access to memories described in connection with FIG. 7 above includes components wherein the step of identifying that a conflict exists is performed during the first half of a clock cycle, and a granting of a request for access to a selected one of the processor unit and input/output device over the system bus to at least one of the system memory and local memories is likewise performed during the first half of a clock cycle.

The bus arbitration system disclosed herein has particular application in a data processing system having a plurality of application processors connected in parallel to perform high-speed vector and nonvector processing calculations.

The bus arbitration method of the present invention ensures that each system bus cycle is utilized for transferring data for each clock cycle. Also, if a processor unit is making a substantial portion of its requests for access to its associated local memory and other users are making fewer requests for accesses to that associated processor unit's local memory, the bus arbitration process will enable the processor unit to access its associated local memory over the local data bus, thereby freeing the system data bus for access by other processor units and the input/ouput device.

Based upon the bus arbitration method of the present invention, if a processor unit's requests are mixed between accesses over a local bus and a system bus, a certain portion of the clock cycle is lost by the processor's changing its state from a local bus access mode to a system bus access mode. However, such losses in the clock cycle time are compensated by a portion of the clock cycle gained as the state of the processor unit is switched from a system bus access to a local bus access. Although a portion of the clock cycle can be either gained or lost, as described above, the overall system memory performance can never be worse than the condition state wherein the system data bus is utilized for every memory access between any of the processor units and the input/output device.

By sharing the request for priority between processor units and the input/output device, the bus arbitration system of the present invention permits local processor units to obtain access to its associated local memory during system operation, thereby ensuring that the processor unit will not be precluded from a reasonable share of clock cycles for accessing its associated local memory over the local bus.

What is claimed is:

1. A data bus arbitration system in a data processing system having a plurality of processing units each of which are coupled through a local data bus to an associated local memory and a system data bus which interconnects said processing units and local memories parallel to the local data bus, said system data bus being responsive to an external system request to access any one of the associated local memories independently of the processing units requests, said processing units including two states for accessing its local memory, a first state wherein access to its local memory is provided over the system data bus, and a second state wherein access to its associated local memory is provided over a local bus, said data bus arbitration system comprising
    means coupled to each of said processing units for monitoring when access to an associated local memory is requested by one or more processing units each being in its first state and coupled to the system data bus for monitoring when access is requested by an external system request over the system data bus to an associated local memory;
    means responsive to said monitoring means for determining whether said access can be provided over each of said system data bus and a local data bus;
    priorty logic means coupled to said monitoring means and to said determining means for identifying an existence of a conflict due to one or more of the processing units and an extrenal system request requesting access over the system data bus to an associated local memory and for granting any external system priority to the system bus and to an associated local memory over a request from a selected one of the processing units to and enabling the processing units change from its first state to a second state to secure access to its associated local memory over a local bus and, in absence of a conflict requesting a local memory associated with a processing unit, to grant a processing unit its sequest in its second state to access its associated local memory over its local data bus; and
    control means means coupled to said priority logic means for enabling said selected one of said processing units and said system data bus being granted priority to access an associated local memory over said system bus and for enabling a processing unit granted priority to access its associated local memory over its local bus;
    said priority logic means being responsive to deny memory access to all other processing units and other system requests for a specific period of time whereupon the priority logic means determines a new prioity from requests from the processing units and external systems requests.

2. A data bus arbitration system in a data processing system which operates on clocked cycles wherein the data processing system includes a plurality of processing units each of which are coupled through a local data bus to an associatde local memory, a system data bus which interconnects said processing units and associated local memories in parallel to the local data bus and at least one input/output device and at least one system memory connected to and capable of transferring data over said system data bus therebetween and to each of said processing units and associated local memories, said data bus arbitration system comprising
    means coupled to each of said processing units and input/output device for monitoring when access is requested by at least one of a processing unit and an input/output device for use of the system data bus to transfer data between at least one of an associated local memory and the system memory during a clock cycle;
    means responsive to said monitoring means for determining whether said access can be provided over each of said system data bus and a local data bus during the clock cycle;
    priority logic means coupled to said monitoring means and to said determining means for identifying existence of a conflict due to one or more of the processing units and the input/output device requesting access over the system data bus to at least one of said system memory and an associated local memory during the clock cycle and for granting access to a selected one of the processing units and the input/output device over the system data bus to at least one of the system memory and an associated local memory during the clock cycle and in absence of a conflict in a request to access a local memory associated with a processing unit for granting access to a processing unit to access its associated local memory over its local data bus during the clock cycle;

control means means coupled to said priority logic means for enabling said selected one of said processing units and said input/output device being granted priority to access at least one of said system memory and an associated local memory over said system bus and for enabling a processing unit granted priority to access its associated local memory over it associated local bus to access its associated local memory;

said priority logic means being responsive to deny memory access to all other processing units and the input/output device for that clock cycle.

3. A data bus arbitration system in a data processing system which operates on clock cycles wherein the data processing system includes a plurality of processing units each of which are coupled through a local data bus to an associated local memory, a system data bus which interconnects said processing units and local memories in parallel to the local data bus and at least one input/output device and at least one system memory connected to and capable of transferring data over said system data bus therebetween and to each of said processing units and local memories, said data bus arbitration system comprising means coupled to each of said processing units, said input/output device and said system memory for monitoring when access is requested by at least one of a processing unit and the input/output device to said system memory and to one of the local memories during a clock cycle;

means responsive to said monitoring means for derermining whether said access can be provided over each of said system data bus and a local data bus during the clock cycle;

priority logic means coupled to said monitoring means and to said determining means for identifying existence of a conflict due to one or more of the processing units and the input/output device requesting access over the system data bus to at least one of said system memory and a local memory during the clock cycle and for granting access to a selected one of the processing units and the input/output device over the system data bus to access at least one of the system memory and local memories during the clock cycle and in the absence of a conflict in a request to access a local memory associated with processing units for granting access to a processing unit to access its associated local memory over its local data bus during the clock cycle; and control means coupled to said priority logic means for enabling said selected one of said processing units and said input/output device being granted priority to access at least one of said system memory and local memories over said system bus and for enabling a processing unit granted priority to access its associated local memory over it associated local bus;

said priority logic means being responsive to deny memory access to all other processing units and the input/output device for the clock cycle.

4. The data bus arbitration system of claim 1 wherein said priority logic means performs an identification of conflicts and grants access to a selected one of a said processing unit and the input/output device during a first half of a clock cycle and wherein said control means enables data which has been read by at least one of a processor unit and input/output device granted access to a memory in a preceding clock cycle to be returned to the accessed memory.

5. The data bus arbitration system of claim 2 wherein said control means enables the selected one of the processor unit and input/output device granted priority by said priority logic means to utilize said system data bus and local data bus during a second half of the clock cycle to access a selected memory associated with a processing unit with a memory address for the data to be stored in and read out thereof and wherein the data to be stored in the memory at the memory address is concurrently transmitted to that memory.

6. A method for arbitrating access to memories in a data processing system which operates on clocked cycles wherein the data processing system includes a plurality of processing units each of which are coupled through a local data bus to an associated local memory, a system data bus which interconnects said processing units and local memories in parallel to the local data bus and at least one input/output device and at least one system memory connected to and capable of transferring data over said system data bus therebetween and to each of said processing units and local memories, said method comprising the steps of monitoring each of said processing units and said input/output device for determining when access is requested by at least one of the processing units and the input/output device to at least one of said system memory and local memories during a clock cycle;

determining whether requested said access can be executed over each of said system data bus and a local data bus during the clock cylce;

identifying existence of a conflict due to one or more of the processing units and the input/output device requesting access over the system data bus to at least one of said system memory and a local memory associated with a processing unit during the clock cycle and for granting access to a selected one of the processing units and the input/output device for accessing over the system data bus at least one of the system memory and the local memories during a clock cycle and, in absence of a conflict in a request to access the a local memory associated with a processing unit, for granting access to a processing unit to access its associated local memory over its local data bus during the clock cycle; and enabling said selected one of said processor units and said input/output device being granted priority to access over said system bus at least one of said system memory and the local memories and for enabling a processing unit granted priority to access its associated local memory over it associated local bus wherein all other processing units and the input/output device are denied access due to conflicts in requests for accessing other local memories and the system memory for the clock cycle.

7. The method for arbitrating access to memories of claim 6 further comprising the steps of identifying conflicts in requests during a first half of the clock cycle and for granting a request for access to a selected one of the processing unit and input/output device over the system data bus to at least one of the system memory and local memories.

8. A method for arbitrating access to memories in a data processing system which operates on clocked cycles wherein the data processing system includes a plurality of processing units each of which are coupled through a local data bus to an associated local memory, a system data bus which interconnects said processing units and local memories in parallel to the local data bus and at least one input/output device and at least one system memory connected to and capable of transferring data over said system data bus therebetween and to each of said processing units and local memories, said method comprising the steps of monitoring with a monitoring means each of said processing units and said input/output device for determining when access is requested by at least one of a processing unit and the input/output device to at least one of said system memory and said local memories during a clock cycle;

determining with a determination means whether said access can be executed over each of said system data bus and a local data bus during the clock cycle;

identifying with a priority logic means existence of a conflict due to one or more of the processing units and the input/output device requiring access over the system data bus to at least one of said system memory and a local memory associated with a processing unit during the clock cycle and for granting access to a selected one of the processing units and the input/output device for accessing over the system data bus at least one of the system memory and local memories during the clock cycle and, in absence of a conflict in a request to access a local memory associated with a processing unit, for granting access to a processing unit to access its associated local memory over its local data bus during the clock cycle; and enabling with a control means said selected one of said processing units and said input/output device being granted priority to access over said system bus at least one of said system memory and the local memories and for enabling a processing unit granted priority to access its associated local memory over it associated local bus wherein all other processing units and the input/output device are denied access due to conflicts in requests for accessing other local memories and the system memory for the clock cycle.

* * * * *